(12) United States Patent
Chun et al.

(10) Patent No.: US 8,661,023 B1
(45) Date of Patent: Feb. 25, 2014

(54) OPTIMIZING SEARCH QUERY LOGIC TO SPEED RETRIEVAL

(75) Inventors: Won S. Chun, New York, NY (US); Herb Derby, Yorktown Heights, NY (US); Douglas Lee Taylor Rohde, East Braircliff Manor, NY (US); Xiaotong Zhuang, Jersey City, NJ (US); Hermanpreet Singh, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 1 day.

(21) Appl. No.: 13/588,545

(22) Filed: Aug. 17, 2012

Related U.S. Application Data

(60) Provisional application No. 61/678,448, filed on Aug. 1, 2012.

(51) Int. Cl.
*G06F 17/30* (2006.01)

(52) U.S. Cl.
USPC .......................................................... 707/718

(58) Field of Classification Search
USPC ................... 707/2, 3, 714, 718; 709/204–206
See application file for complete search history.

(56) References Cited

U.S. PATENT DOCUMENTS

| | | | |
|---|---|---|---|
| 6,691,101 B2 * | 2/2004 | MacNicol et al. | ............ 707/714 |
| 7,617,183 B1 | 11/2009 | Harvey | |
| 7,925,655 B1 | 4/2011 | Power et al. | |

\* cited by examiner

*Primary Examiner* — Etienne Leroux
(74) *Attorney, Agent, or Firm* — Brake Hughes Bellermann LLP

(57) ABSTRACT

Systems and methods are provided for processing a query at a computer system. The method includes building a query tree based on the query and grouping at least some nodes of the query tree into a group of nodes. Grouping is based on an operator node that is a parent of the at least some nodes. The group of nodes retains the functionality of the operator node but the operator node is eliminated by replacing the operator node with the group of nodes in the query tree. The method also includes traversing the query tree to obtain a result list from a search index that is responsive to the query.

27 Claims, 12 Drawing Sheets andMatch(node, id)
{ // Returns true if ID is in all of node.children
  for i ← 1 to n  // n=number of node.children
    if not MATCH(node.children(i), id) then
      return false
    endif
  endfor
  return true
}

FIG. 2 orMatch(node, id)
{ // Returns true if ID is in any of node.children
  for i ← 1 to n  // n=number of node.children
    if MATCH(node.children(i), id) then
      return true
    endif
  endfor
  return false
}

FIG. 3 leafMatch(node, id)
{ // Returns true if ID is in leaf node's posting list
  if id is in node.postinglist then
      return true
  endif
  return false
}

FIG. 4

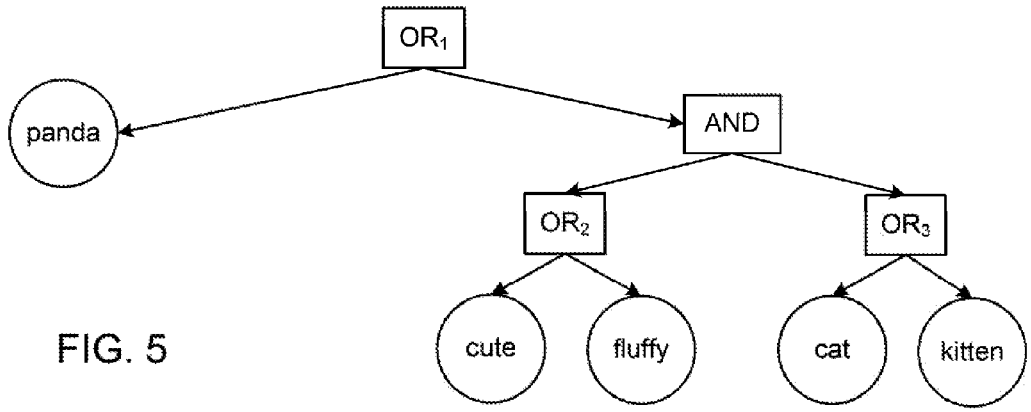
FIG. 5
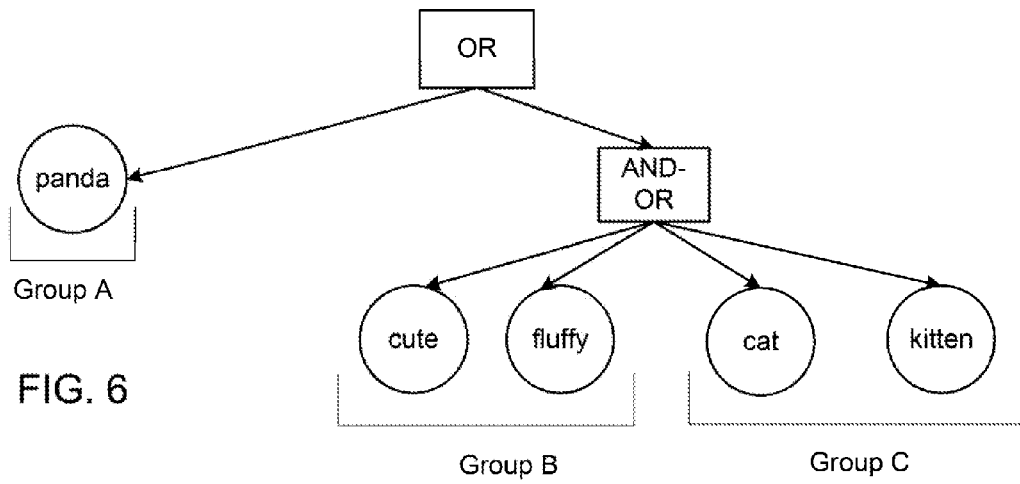
FIG. 6
| Index | Node         | Next True Index | Next False Index |
|-------|--------------|-----------------|------------------|
| 1     | Return TRUE  |                 |                  |
| 2     | Return FALSE |                 |                  |
| 3     | cute         | 5               | 4                |
| 4     | fluffy       | 5               | 2                |
| 5     | cat          | 1               | 6                |
| 6     | kitten       | 1               | 2                |
FIG. 7

| Index | Node | Next True Index | Next False Index |
|---|---|---|---|
| 1 | Return TRUE | | |
| 2 | Return FALSE | | |
| 3 | cute | 6 | 4 |
| 4 | fluffy | 6 | 2 |
| 5 | cat | 1 | 6 |
| 6 | kitten | 1 | 2 |

```
flatMatch(node, id)
{ // node has a jump table as one of its properties
   i ← 3
   loop
      if (MATCH(node.jumptable[i].term, id) then
         i ← node.jumptable[i].next_true
      else
         i ← node.jumptable[i].next_false
      end if
      if (i = 1)
         return true
      else if (i = 2)
         return false
      endif
   end loop
}
```

| Index | Node | Next True Index | Next False Index |
|---|---|---|---|
| 1 | Return TRUE | | |
| 2 | Return FALSE | | |
| 3 | panda | 1 | 4 |
| 4 | cute | 6 | 5 |
| 5 | fluffy | 6 | 2 |
| 6 | cat | 1 | 7 |
| 7 | kitten | 1 | 2 |

```
flatQuery(terms, id) {
    if (leafSearch(terms_panda, id) then
            return true
    else if (leafSearch(terms_cute, id) then
            if leafSearch (terms_cat, id) then
                    return true
            else if (leafSearch (terms_kitten, id) then
                    return true
            else
                    return false
            end if
    else if (leafSearch (terms_fluffy, id) then
            if (leafSearch(terms_cat, id) then
                    return true
            else if (leafSearch (terms_kitten, id) then
                    return true
            else
                    return false
            end if
    else
            return false
    end if
}
```

FIG. 13

```
leafNextMatch(node, id) {
    // Note: the id passed in is nondecreasing across calls within the same node.
    // END_ID is higher than any valid document id.
    while (node.index <= size(node.postinglist) and (id > node.postinglist_node.index)
            increment node.index
    end while if (node.index >= size (node.postlinglist)
            return END_ID
    else
            return node.postinglist_node.index
            // this will be the id passed in if there is a matching id in the posting list
            // otherwise it will be the id just greater than the id passed in
    end if
}
```

FIG. 14

```
andNextMatch(node, id) {
    // Note: the id passed in is non-decreasing across calls within the same node.
    // END_ID is higher than any valid identifier
    for each child in node.children do
            min_id ← nextMatch(child, id)
            if (min_id == END_ID)
                    return END_ID
            else if (min_id <> id) then
                    id ← min_id
                    restart the for loop using min_id (e.g. goto line 2)
            end if
    end for
    return min_id
}
```

```
flatNextMatchQuery(terms, id) {
    id_p ← leafNextMatch(terms_panda, id)
    if (id_p <> id) then
        id_f ← min(leafNextMatch(terms_cute, id)
                   leafNextMatch(terms_fluffy, id))
        if (id_f <= id_p) then
            id_r ← min(leafNextMatch(terms_cat, id)
                       leafNextMatch(terms_kitten, id))
            if (id_f = id_r) then
                return id_f
            else
                if (id_r > id_p) then
                    return id_p
                else
                    id ← id_r
                    goto line 1
                end if
            end if
        else
            return id_p
        end if
    else
        return id_p
    end if
}
```

FIG. 17

| | Node | match_id == min_id | match_id > min_id |
|---|---|---|---|
| 1 | cute | group_min_id = END_ID<br>goto 3 | group_min_id = min(group_min_id, match_id)<br>goto 2 |
| 2 | fluffy | group_min_id = END_ID<br>goto 3 | group_min_id = min(group_min_id, match_id)<br>min_id = group_min_id<br>group_min_id = END_ID<br>goto 3 |
| 3 | cat | goto 5 | group_min_id = min(group_min_id, match_id)<br>goto 4 |
| 4 | kitten | goto 5 | group_min_id = min(group_min_id, match_id)<br>min_id = group_min_id<br>group_min_id = END_ID<br>goto 1 |
| 5 | return min_id | | |

FIG. 18

OPTIMIZING SEARCH QUERY LOGIC TO SPEED RETRIEVAL

CROSS REFERENCE TO RELATED APPLICATION

This application claims priority under 35 U.S.C. §119 to Provisional Patent Application Ser. No. 61/678,448 entitled "Optimizing Search Query Logic to Speed Retrieval" filed on Aug. 1, 2012. The subject matter of this earlier filed application is hereby incorporated by reference.

BACKGROUND

Search engines assist users in locating information found in documents, including, for example, web pages, PDFs, word processing documents, images, other types of files, etc. In order to quickly and effectively search the various documents for relevant information, search engines may index the contents of the documents and use the index to respond to search queries. A search engine for a corpus of documents, for example the Internet, may have a search index including billions of documents. When a search query is received, the search engine processes and executes the query to generate a list of results, or documents responsive to the query. Search queries are often processed using a tree structure, but in a large document corpus, such as the Internet, query processing time may be unacceptably slow using current query processing techniques because users have come to expect minimal time between submitting a request and receiving search results.

SUMMARY

Systems and methods are disclosed for improving processing time for a search query that uses a hierarchical query tree structure. Techniques for improving or optimizing the query processing may include minimizing the number of virtual function calls through de-virtualization, inlining, flattening the query tree, and having the nodes return a next-matching identifier if the provided identifier does not satisfy the node. In some implementations, these optimizations may be combined for further improvements.

One aspect of the disclosure can be embodied in a method of processing a query at a computer system comprising one or more processors and a memory storing one or more programs for execution of the method by the one or more processors. The method includes building a query tree based on the query and grouping at least some nodes of the query tree into a group of nodes based on an operator node that is a parent of the at least some nodes. The group of nodes may retain the functionality of the operator node. The method may also include eliminating the operator node by replacing the operator node with the group of nodes in the tree and traversing the tree to obtain a result list from a search index responsive to the query.

The method can include one or more of the following features. For example, as part of traversing the tree each call to a child node may return a plurality of matches or the group of nodes may include at least one leaf node and at least one operator node. In some implementations, the query is a document search query, the at least some nodes are leaf nodes representing one or more query terms and the result list indicates documents responsive to the query. In such implementations, as part of traversing the tree, each call to a child node may include a first document identifier and the leaf nodes may use the first document identifier as a starting identifier and/or the child node may return a second document identifier, the second document identifier being a next matching document and the child node may return an error code if a next matching document does not exist.

As another example, the operator node may be an OR operator and traversing the tree may include skipping remaining members of the group once a matching result has been identified from a member of the group. Additionally the operator node may be an AND operator and traversing the tree may include skipping remaining members of the group once a member of the group fails to find a matching result. In some implementations, replacing the operator node includes modifying a parent node of the operator node to recognize the group of nodes. Modifying the parent node may include creating a jump-table that enables a particular node to branch directly to another node. In such an implementation, as part of traversing the tree, the method may also include cutting a branch of the query tree by modifying the jump-table when the another node exhausts its possible matches. As another example, modifying the parent node may include generating logic for the parent node using control flow analysis and using the logic to search the index.

In some implementations, the method may also include determining whether the operator node is a specific type of operator and performing the replacing when it is determined that the operator node is the specific type of operator. The method may also include collecting statistics on frequency of use of group configurations and determining whether the statistics indicate flattening is appropriate. For example, the replacing may not be performed when it is determined that the statistics do not indicate flattening is appropriate.

In another aspect, a method of flattening a search query at a computer system includes one or more processors and a memory storing one or more programs for execution of the method by the one or more processors. The method includes building a query tree based on the query and identifying a portion of the tree for flattening, the portion including at least one operator node and children of the operator node. The method may also include eliminating the at least one operator node by generating a jump-table for the portion of the tree, the jump-table including a row for the children of the operator node, each row including an indication of a next node to invoke based on a result of a match operation performed by the node associated with the row and traversing the tree using the jump-table and a search index to obtain a result list that is responsive to the query.

The method can include one or more of the following features. For example, as part of traversing the tree, the method may also include identifying an end-of-list condition for a match operation on a particular node and modifying the jump-table to skip the row associated with the particular node in response to identifying the end-of-list condition. As another example, the match operation may return a first identifier, the first identifier being equal to or greater than a second identifier that is given to the match operation. In such implementations, the jump-table may include an indication of a first next node if the second identifier matches the first identifier and include an indication of a second next node if the first identifier is greater than the second identifier.

In another aspect a tangible computer-readable storage medium having recorded and embodied thereon instructions that, when executed by one or more processors of a computer system, cause the computer system to perform any of the methods previously described.

Other implementations of these include corresponding systems, apparatus, and computer programs, configured to perform the actions of the methods, encoded on computer storage devices.

The details of one or more implementations are set forth in the accompanying drawings and the description below. Other features will be apparent from the description and drawings, and from the claims.

BRIEF DESCRIPTION OF DRAWINGS

FIGS. 2-4 illustrate example pseudo-code for implementing a query tree traversal.

FIG. 5 illustrates an example of a typical query tree.

FIG. 6 illustrates an example of a query tree with one level flattened, consistent with some implementations.

FIG. 7 illustrates an example of a jump-table used to flatten the query tree.

FIG. 13 illustrates an example of pseudo-code for multi-layer flattening of the query tree illustrated in FIG. 5.

FIG. 14 illustrates an example of pseudo-code for a leaf node using next-match query execution.

FIG. 17 illustrates an example of pseudo-code for multi-layer flattening of the query tree illustrated in FIG. 5 using next-match query execution.

FIG. 18 illustrates another example of a jump-table used to flatten a query tree using next-match.

Like reference symbols in the various drawings indicate like elements.

DETAILED DESCRIPTION

Figure 1:
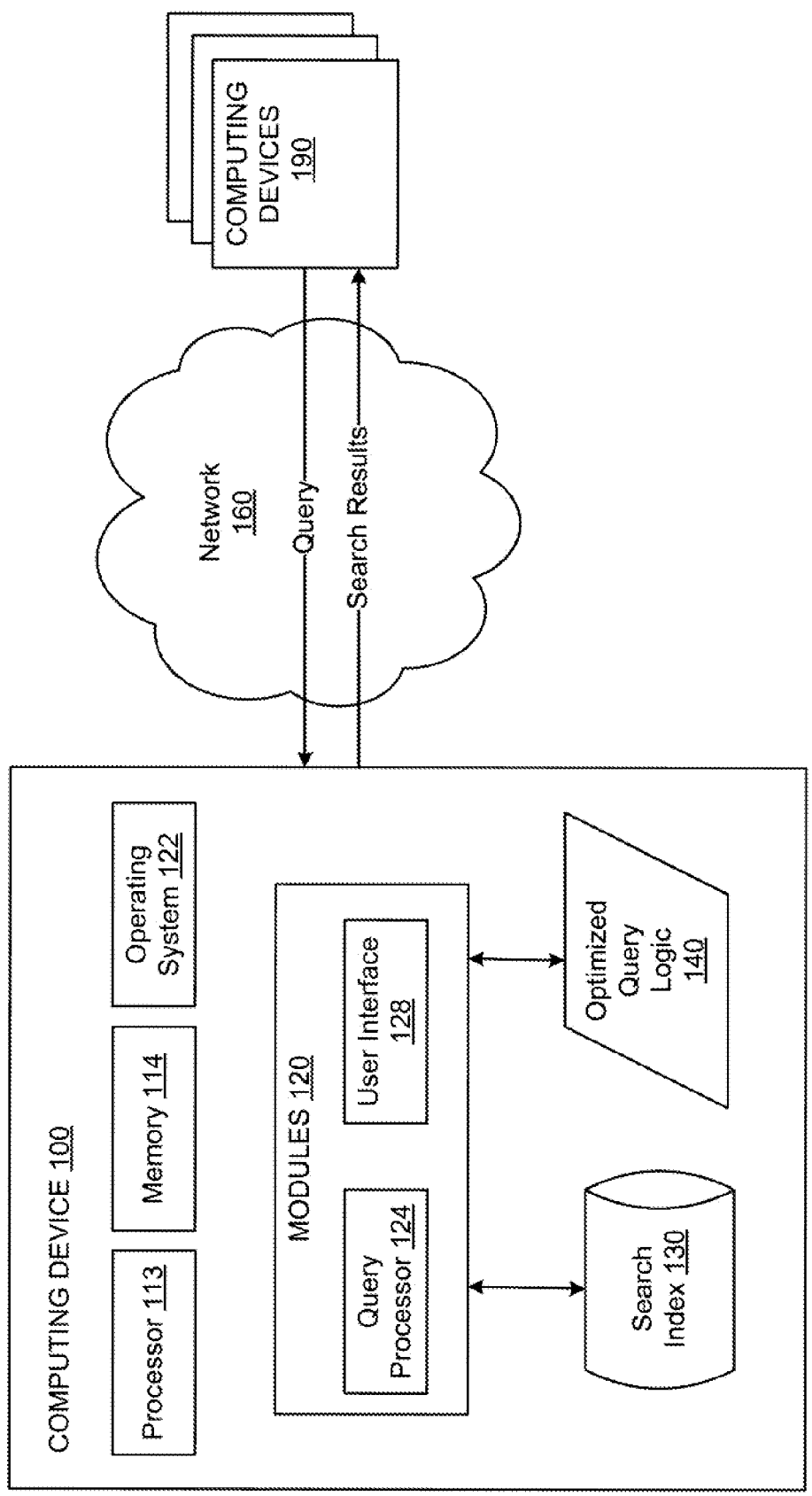
FIG. 1 illustrates an example system in accordance with the disclosed subject matter.

A search engine may index documents using an inverted index having a plurality of posting lists, with each posting list comprised of a term or phrase and a list of documents or document identifiers that include the term or phrase. The index may also include other information. In some implementations, the posting lists may be housed on different computing devices and the logical group of posting lists across the computing devices may collectively be referred to as the search index for the search engine.

When the search system receives a search query, it may create a query tree representing the query. The query may be structured as a tree of nodes in which each node matches a subset of the available documents. A typical leaf node may have an associated index, such as a posting list, that is used to find all documents containing a particular term or phrase. A typical intermediate node or the root node might apply an operation (e.g., AND, OR, NOT, etc.) to the responses from its children. FIG. 5 illustrates a typical query search tree. Documents responsive to the query of FIG. 5 contain the terms "panda" or either "cute" or "fluffy" and either "cat" or "kitten."

To traverse the tree and generate a list of documents responsive to the query, the search system may start at the root node and make match( ) calls to the children using virtual function calls. The calls may ask each child whether the child matches a particular document id. Interior nodes of the tree, or operator nodes, may in turn ask its children whether they match the document identifier using virtual function calls. Leaf nodes, which represent a term or phrase of the query, respond with a true or false answer. The answer is passed back up the tree to the parent, and the parent performs the requested operation on the answers. In some circumstances this includes passing the response back down to one or more of its children. The parent then sends the result of the operation back up the tree to its parent. When traversing the tree, the left-most branches are typically invoked before right-most branches. This is known as a depth-first search.

Once the root node receives a response for a first document id, the document id may be passed from the root to the next child node, and the search system determines whether the document id satisfies the operations of the next node. The document identifier is passed up and down the tree until it is determined whether or not the document is responsive to the query. The root node may then send the next document identifier down the tree. The tree traversal continues in this manner until the matching documents are found or it is determined that no documents match. The tree traversal may also be referred to as executing the query. Any matching documents can be returned in a results list. A drawback of the described query structure and traversal is that function calls to traverse the tree are expensive and numerous, and virtual function calls make the process even more expensive. The result is to slow down query response time.

To speed up the retrieval of matching documents, some implementations may flatten the structure of the tree to eliminate one or more function calls while still retaining the logic of the original tree. The flattened tree eliminates one or more intermediate operational nodes with a group or set of child nodes. When traversing the tree the group a child node belongs to is considered by the parent node before issuing the next match command. A flattened query tree provides the opportunity to further improve query response time by short circuiting branches of the tree during query execution, calling the next node directly rather than passing responses up to a parent node and back down to the next node, and in-lining function calls.

Some implementations may also improve query response time by having nodes return the document identifier of the next document that is matched by the node and whose identifier is greater than or equal to that of the given document identifier rather than just returning a true/false response for the given document identifier. This process may be referred to as tree traversal using next-match. Traversing the tree using next-match allows the query processor to make fewer invocations of the tree root, thus reducing the number of function calls made and resulting in a faster query response time.

Query tree flattening may be combined with next-match traversal to produce even more efficient query retrieval. Other optimization techniques may also be used in combination with flattening and next-match to further improve query response time, as will be discussed in more detail below.

FIG. 1 is a block diagram of a search system 100 in accordance with an example implementation. The system 100 may be used to implement a query processing system using the techniques described herein. The depiction of system 100 in FIG. 1 is described as an Internet-based search engine with an inverted index having, by way of example, terms associated with document identifiers in a posting list. Documents may include any type of files with content, including web pages, PDF documents, word-processing documents, images, sound files, JavaScript files, database tables, DNA sequences, etc. Other network configurations and applications of the described technology may be used. For example, the search engine may be used to search local documents, content stored on portable devices, or documents available through other technologies.

Figure 21:
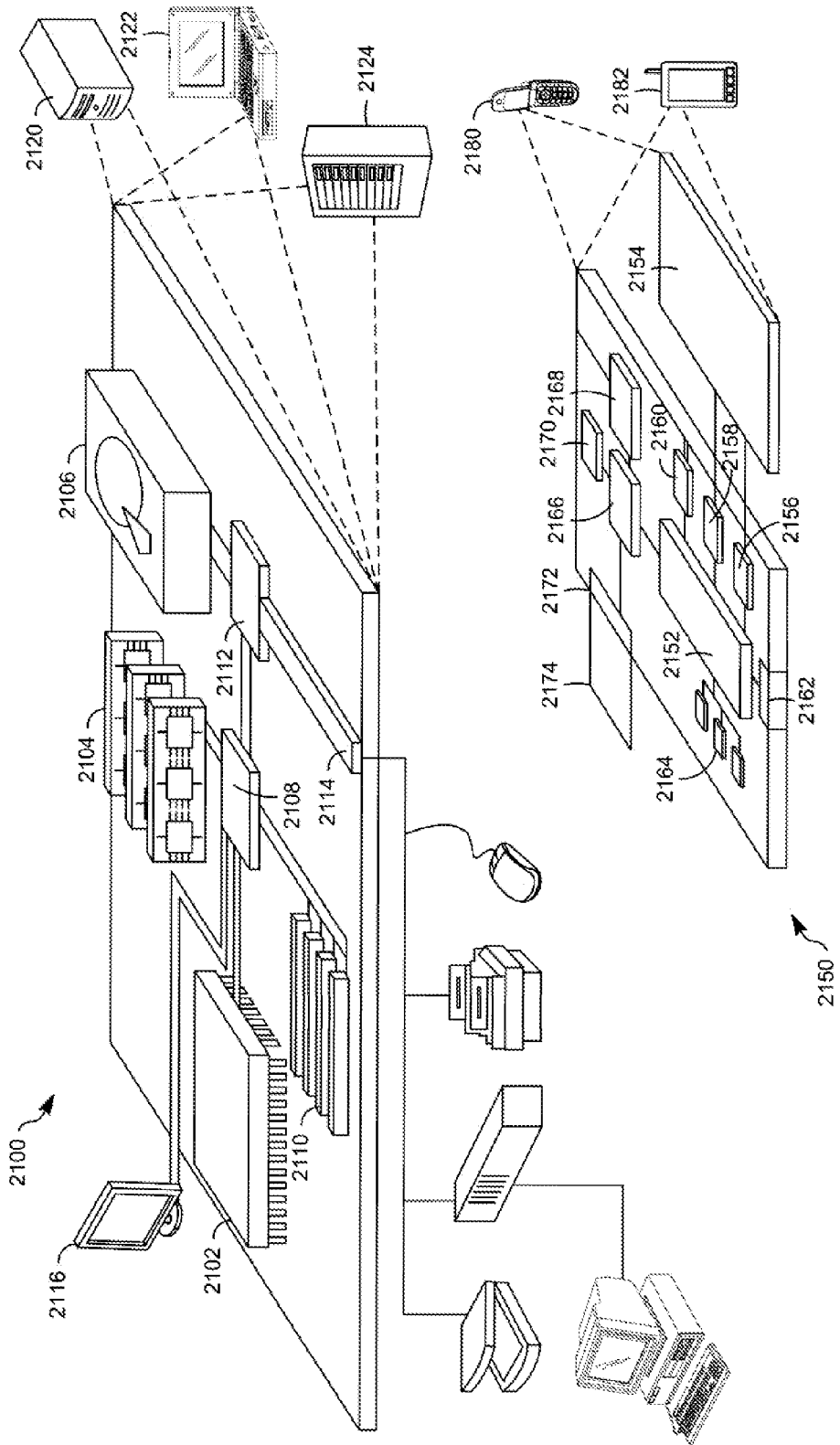
FIG. 21 shows an example of a computer device that can be used to implement the described techniques.

The search system 100 may include an indexing system, a search system, and a serving cluster. The indexing system, search system, and serving cluster may be computing devices that take the form of a number of different devices, for example a standard server, a group of such servers, or a rack server system. In addition, the indexing system, search system, and serving cluster may be implemented in a personal computer, for example a laptop computer. The indexing system, search system, and serving cluster may be implemented in a single computing device or in separate computing devices and may be examples of computer device 2100, as depicted in FIG. 21. The indexing system may search the document corpus and create the posting lists that comprise the search index 130, the serving cluster may store the search index 130 and may work with the search system to receive and respond to queries of the search index 130. The search system may rank the search results and return the results to the requestor. Although FIG. 1 illustrates these three systems as one computing device 100 for brevity, as mentioned above, each system may be implemented in separate computing devices or in a group of computing devices that communicate over a network.

Accordingly, search system 100 can include one or more processors 113 configured to execute one or more machine executable instructions or pieces of software, firmware, or a combination thereof. Search system 100 can include an operating system 122 and one or more computer memories 114, for example a main memory, configured to store one or more pieces of data, either temporarily, permanently, semi-permanently, or a combination thereof. The memory may include any type of storage device that stores information in a format that can be read and/or executed by processor 113. Memory 114 may include volatile memory, non-volatile memory, or a combination thereof, and store modules 120 that, when executed by processor 113, perform certain operations. In other implementations, the modules 120 may be stored in an external storage device (not shown) and loaded into memory 114. The modules 120 may enable the search system 100 to receive queries from requestors, analyze and optimize the queries, to run the queries against the search index 130, and to provide result lists to the requestors. For example, modules 120 may include a query processor 124 and user interface 128. User interface 128 may facilitate communications with the query requestor by, for example, receiving and parsing query parameters and formatting result lists for presentation to the requestor.

Query processor 124 may analyze the query, create the query tree, and create optimized query logic 140 used to execute the query against the search index 130. As part of the analyzing the query and creating logic query 140, the query processor 124 may optimize the query using flattening and/or a next-match process, as described in more detail below. The query processor 124 may be a single module or a collection of modules.

For example, in some implementations, search system 100 is a distributed Internet-based search system having an inverted index, such as index 130. The inverted index may be a collection of posting lists, where a posting list comprises a term or phrase and a list of document identifiers. In a distributed search system, the index entries, or posting lists, may be stored on several different machines, collectively known as a serving cluster. The serving system may receive queries and may partially optimize the query and send the query to the serving cluster. The serving cluster may distribute the partially optimized query to the various machines for execution against the posting lists stored on each machine. In some implementations, the various machines may each perform additional query optimization based on the entries in the posting lists that it hosts. Thus, in some implementations, the query processor module 124 may exist partially on the machines of the serving cluster and partially on the serving system. In some implementations the serving system may pass the query to the serving cluster and the computing devices of the serving cluster may perform all of the optimization of the query. In such implementations, the query processor 124 may exist on the computing devices of the serving cluster.

Query requestors may use computing devices 190 to submit queries to the search system 100. Search system 100 may also provide query results to computing devices 190. Computing devices 190 may be any computing device capable of communicating a query request and providing a query response to the requestor. For example, computing devices 190 may include personal computers, laptops, netbooks, tablets, smart phones, servers, televisions with at least one processor, etc. Computing devices 190 may be examples of computer devices 2100 or 2150, as depicted in FIG. 21.

Search system 100 may be in communication with computing devices 190 over network 160. Network 160 may be for example, the Internet or the network 160 can be a wired or wireless local area network (LAN), wide area network (WAN), etc., implemented using, for example, gateway devices, bridges, switches, and/or so forth. Via the network 160, the search system 100 may communicate with and transmit data to/from computing devices 190.

FIG. 5 illustrates an example of a query tree based on the query "panda OR ((cute OR fluffy) AND (cat OR kitten))." The query tree has operator nodes and term nodes. For example, the tree of FIG. 2 includes three OR operator nodes and one AND operator node. The operator nodes are the interior nodes in the tree and have one or more child nodes. The operator nodes represent a logical operation performed on the results of the children. Although FIG. 2 shows AND and OR operations, the logical operations may include other operations, such as NOT operations, N OF M operations, and other logic operations.

The term nodes of the tree may represent words or phrases of the query. Term nodes may also include a node for which a posting list has been pre-computed for any tree or sub-tree. For example, a posting list may be computing at index building time or while the serving process is running. Thus, reference to a term node or to the term associated with a leaf node may not be limited to terms or phrases, but can include any unit that has an associated posting list. Term nodes do not have children in the tree and, thus, may also be referred to as leaf nodes. Terms nodes may be associated with a list of documents, for example in the form of document identifiers, that contain the term. For example, the index may be comprised of posting lists, with each posting list including a term or phrase and the document identifiers that contain the term or phrase. Each term node may be associated with one of these posting lists. The query tree of FIG. 5 may be represented in tabular form with two tables, one for operators and one for terms and their associated document identifiers, as shown below, although other representations of the query tree in memory are possible:

TABLE 1a

| Operator | Children |
|----------|----------|
| $OR_1$ | panda, AND |
| AND | $OR_2, OR_3$ |
| $OR_2$ | cute, fluffy |
| $OR_3$ | cat, kitten |

TABLE 2a

| Term | Document IDs |
|------|--------------|
| panda | 1, 6, 12 |
| cute | 1, 2, 5, 7, 9 |
| fluffy | 4, 7 |
| cat | 4, 8 |
| kitten | 9 |

In a traditional query tree, each node in the tree returns a true/false answer when given a document identifier. Term nodes return a true if the document identifier passed in appears in the posting list for the node and a false otherwise. Operator nodes return the result of the logical operation performed on the values passed back from their children. For example, using the tables above, if a document identifier with a value of 1 is passed to the panda node, the panda node will return true, while if the same document identifier is passed to the cat node, the cat node will return false. The operator nodes apply their operation to the values returned by their child nodes and return the result. In the example of the tables above, if a document identifier with a value of 1 is passed into the $OR_1$ operator node, it will return true, because its child panda returns true, and when one child is true, the OR operator always returns true. Likewise, an AND operator will return false if any of its children are false.

In a traditional query tree, the query processor may use a virtual MATCH( ) function in a recursive manner to call to each child node. The MATCH( ) logic may receive a node and an identifier as parameters and may call a different procedure depending on the type of node passed in. For example, the virtual MATCH( ) function may call or Match( ) logic if the node is an OR operation, or leafMatch( ) logic if the node is a term or leaf node. In some implementations, there may be various versions of leafMatch( ) depending on type of term or phrase or the type of posting list associated with the term or phrase, and the MATCH( ) routine may determine which of these to call when invoked. In some implementations each node may store data, such as a pointer to a table of procedures, that helps the MATCH( ) function call the correct procedure.

Examples of or Match, and Match, and leafMatch logic are shown in FIGS. 2-4. As can be seen in FIGS. 2-4, one way to minimize the number of function calls is to skip children once the result of an operator is known. For example, the or Match logic of FIG. 3 returns true as soon as one child matches. Likewise, the and Match logic of FIG. 4 returns false as soon as one child does not match. This avoids unnecessary calls to the remaining children when the result of the operation is already known and illustrates one way to reduce the number of function calls made to process a query.

In traversing the tree, the query processor may start with a first document identifier and pass that identifier to the root node using a first call to MATCH( ). In the example of FIG. 5, the root is the $OR_1$ operator. The root node calls the virtual MATCH( ) function for each of its child nodes, which in the example of FIG. 5 are the panda node and the AND node. Thus, the panda node and the AND node are asked if they match the document identifier. The AND node calls the virtual MATCH( ) function for each of its child nodes, the $OR_2$ and the $OR_3$ nodes, which will in turn call the MATCH( ) function for its children. The results are passed back up through the recursive calls to the root operator, and the result of the root operator indicates whether the document is responsive to the query. This continues with each of the document identifiers from the corpus until a result is known for each document.

Virtual function calls made in a recursive manner, like that described above, can significantly slow down the search process, especially when the document corpus is large. Eliminating such function calls can significantly improve the response time of the search engine.

If a parent node is aware of the type of one or more of its child nodes, the parent node can invoke the appropriate non-virtual match function, such as or Match( ) and leafMatch( ) on those children, rather than invoking the virtual MATCH( ) function, avoiding the overhead of the virtual call. This may be referred to as de-virtualization. For example, a specialized AND node could be created, e.g. an AND-OR node that assumes that all of its children are OR nodes, and calls the non-virtual or Match( ) for its children. Whenever the query processor encounters an AND node with children that are all OR nodes, the query processor may use the specialized AND-OR node in place of a general AND. This avoids the overhead of the virtual MATCH( ) function and can be done at compile time. While de-virtualization works well for common, predictable patterns, such as an OR node with all AND children, de-virtualization is not readily adaptable to arbitrary sets of children, e.g., a combination of OR nodes, NOT nodes, leaf nodes, etc.

De-virtualization further enables inlining of function calls. When a function call is inlined, the body of the function is effectively copied into the body of the calling function. This increases code size, but can improve performance by reducing function call overhead and enabling further optimizations. A degree of inlining is performed automatically by many modern compilers. A virtual function call generally prevents inlining, so de-virtualization can enable the compiler to perform inlining at compile time.

Query Flattening

In some implementations, recursive calls may be minimized by flattening the query tree. To flatten the query tree, the query processor may eliminate one or more intermediate operator nodes, grouping the children together and making the children of the intermediate operator nodes children of the grandparent node. FIG. 6 illustrates an example of a flattened query tree with the $OR_2$ and $OR_3$ operators replaced by their child nodes organized into two groups. The group structure helps maintain the original logic of the tree "(cute OR fluffy) AND (cat OR kitten)" and not "cute AND fluffy AND cat AND kitten." The query processor may generate a new procedure for navigating the children for the grandparent node.

Thus, flattening eliminates at least four function calls per group by allowing the grandparent to make calls directly to the children of the intermediate operator nodes, as illustrated in table 1b below:

TABLE 1b

| Operator | Children |
|---|---|
| OR$_1$ | panda, AND-OR |
| AND-OR | [cute, fluffy], [cat, kitten] |

TABLE 2b

| Term | Document IDs |
|---|---|
| panda | 1, 6, 12 |
| cute | 1, 2, 5, 7, 9 |
| fluffy | 4, 7 |
| cat | 4, 8 |
| kitten | 9 |

Flattening may be accomplished through de-virtualization and in-lining. As explained above, virtualization refers to using the virtual MATCH( ) function, which does not require each node to know what type of nodes it has as children—each operator node need only call the MATCH( ) function and the MATCH( ) function determines the correct logic to invoke. However, to flatten a query tree, the parent node of the operator eliminated needs to know what operation to apply to the nodes of the group, so the query process may perform at least some de-virtualization to flatten the tree. But unlike de-virtualization and inlining, query flattening enables optimization to be performed at run-time rather than just compile time and can be used on an operator node with a mixture of node types as children.

For example, in some implementations, the query processor may create a jump-table that allows the AND-OR node of FIG. 6 to process the groups of nodes. The jump-table may be an array that contains an entry for each node that is part of a group. Each entry may contain an indication of the next node to be called when a document identifier satisfies a particular node and the next node to be called when a document identifier does not satisfy the node. FIG. 7 illustrates an example jump-table for the query tree of FIG. 6. Although FIG. 7 illustrates indices into the jump table as the indication of the next node to be called, other indications may also be used. As one example, the "next true index" and "next false index" may be a pointer rather than an index into the array. Furthermore, nodes need not be leaf nodes to be part of a group, but may be the root of a sub-tree.

Figures 8, 9, 10:
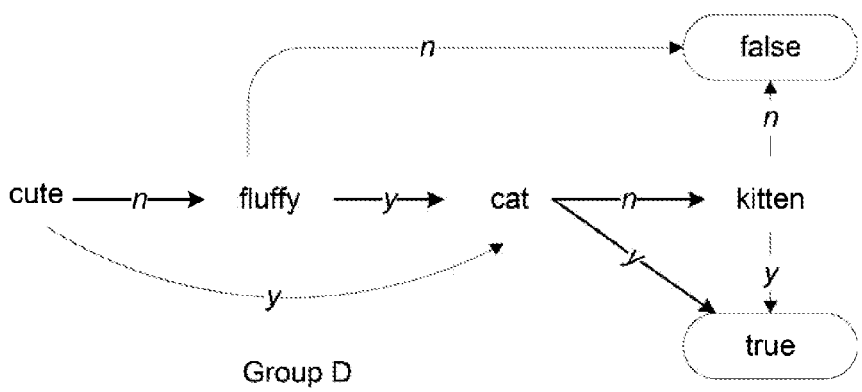
FIG. 8 illustrates a control-flow graph corresponding to the jump-table of FIG. 7.
FIG. 9 illustrates the jump-table of FIG. 7 after sort-circuiting during query execution, consistent with some implementations.
FIG. 10 illustrates an example of pseudo-code using the jump-table.

The query processor may create the jump-table based on a control flow of the portion of the tree being flattened. A control flow determines which node is evaluated next or a match or no match case, and can be generated based on traversal of the portion of the query tree being flattened. The graph illustrated in FIG. 8 depicts a visual representation of the control flow of the AND-OR branch of the query tree illustrated in FIG. 6. The "term" column of the jump-map of FIG. 7 corresponds to the nodes of the graph in FIG. 8, the "next true index" column corresponds to the "y" edges of the graph, and the "next false index" column corresponds to the "n" edges of the graph. The first two entries of the array may represent the finite states "True" and "False." The query processor may not actually generate a control-flow graph, but may create the jump-table in memory and use the jump table to make calls to the child nodes when the AND-OR operator node is called. As illustrated in FIG. 8, once an answer for group B is known to match, the query processor may proceed directly to check the first child in Group C, or the cat node in the example of FIG. 8. For example, when the cute node matches a document the next node to evaluate is cat because cute and fluffy are related by an OR operation so no evaluation of fluffy is needed once it is determined that cute matches. Such direct jumping from one leaf node to the other may be referred to as direct threading. Direct threading eliminates several of the function calls needed to pass the result of a child node up and down a query tree and allows a node to pass its result directly to another node.

The use of a jump-table also allows the query processor to make use of another optimization technique that may be referred to as short circuiting. For example, when a node is known to be done with its matching documents, in other words the node no longer has any matching documents with identifiers greater than the current identifier, the node may be "cut" from the tree. To cut a node from the tree, the query processor, during execution of the query, may change the "next true" or "next false" indices that point to the cut node to the "next false" entry of the node being cut. In other words, if the cat node is finished, the query processor may modify the jump-table so that references to the cat node are replaced with the "next false" index of the cat node, resulting in the jump-table shown in FIG. 9. Such short circuiting is advantageous because it allows the query processor to further reduce function calls as nodes are "used-up" during the query execution. In implementations that use short circuiting, the leafMatch logic may return an indication that the posting list is used-up along with a true/false indication.

To implement the jump-table, for example, the query processor may include flatMatch( ) logic that the virtual MATCH( ) procedure calls when a node is an operator for a group of nodes. The AND-OR node of FIG. 6 may be an example of an operator for a group of nodes. The jump-table may be an attribute of the operator for the group of nodes, in other words the AND-OR node. Thus, the jump-table may be an attribute or property of the node passed to flatMatch( ). The flatMatch( ) logic may call MATCH( ) for each of the children and, depending on the result and the corresponding entries in the jump-table, may continue calling MATCH( ) or may return true/false. An example of pseudo code for flatMatch( ) logic is illustrated in FIG. 10. As a further optimization, the virtual MATCH( ) function may be replaced with a direct call to leafMatch( ) because only term nodes are being called in this example. However, if there are several versions of leafMatch( ), for example due to various properties of the terms or posting lists, or if the child nodes include complex operator nodes, it may be beneficial to keep the call to the virtual MATCH( ) function.

Figures 11, 12:
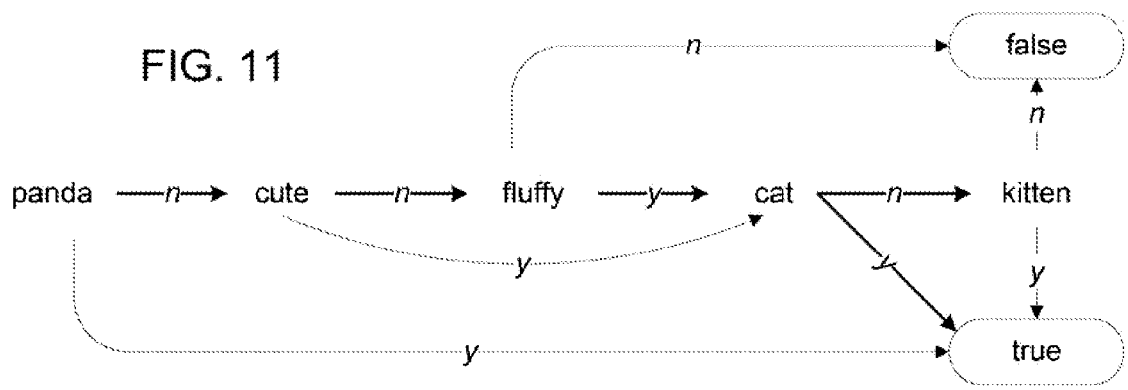
FIG. 11 illustrates a control-flow graph for the query tree of FIG. 5.
FIG. 12 illustrates a jump-table corresponding to the control-flow graph of FIG. 11.

Using the jump-table, multiple layers of the query tree may be grouped together. For example, the query processor may flatten the entire query tree of FIG. 5, so that the root OR$_1$ node becomes a group operator. The control flow for this multi-layer flattening simply adds the panda node to the front, as shown in FIG. 11. The jump-table that corresponds to this flow-control may look like FIG. 12.

Some implementations may use logic generation rather than a jump-table to achieve the flattening. Logic generation may include generating code rather than entries in the jump-table. For example, the query processor may simply traverse the control flow generating a leafMatch( ) call, or MATCH( ) call, for every encountered term and an if/else statement for every y/n edge. For example, the control flow diagram of FIG. 11 may result in the pseudo-code illustrated in FIG. 13. In some implementations, optimizations may be performed on the logic of FIG. 13 by, for example, using a goto statement to remove the redundant if/else statements for the cat and kitten nodes. The query processor may generate code in the form of machine instructions or may generate code in a higher level language that is complied on the fly into machine instructions.

Although the example above illustrates flattening for AND and OR operators, the query processor may also flatten other types of nodes. For example, a NOT of a leaf node may cause the swapping of its true and false jump addresses, index values, or other indications in the jump-table. A NOT of an AND or an OR node can be pushed down the tree using De Morgan's laws.

Flattening may also be used with multiple candidate documents to further improve query response time. With multiple candidate documents, each call to a child includes an array of document identifiers. The child may return an array of true/false values that correspond to the array of identifiers or may return a filtered array of the document identifiers that matched. This further reduces the number of function calls made when traversing the tree.

Because some processing is required to generate the jump-table or generate the code, in some circumstances the processing cost to generate the logic or jump-tables used to flatten the tree may outweigh the savings generated by flattening the tree. To account for this, in some implementations the query processor may perform partial flattening by taking into account properties of the nodes before performing flattening. Properties considered by the query processor may include, but are not limited to, the type of operation performed, the type of nodes involved, the length of a posting list associated with a node, the position of the node in the query tree, the language of the query, etc. For example, if a node is visited infrequently, it may be better not to flatten that part of the tree. As another example, complicated operations like ADJACENT or non-Boolean operators may not be easily flattened. As another example, it may not be efficient to flatten a node with a posting list of one document. Accordingly, the query processor may consider properties of the nodes to be flattened before attempting to flatten the tree and avoid flattening for nodes or queries with specific types of properties. For example, some implementations may flatten AND, OR, and NOT operators, but may not flatten other operators, although it is possible to do so. As another example, some implementations may not flatten when the term nodes have a small number of associated identifiers.

In implementations where the index is stored on various servers, the query processor may optimize the query at the various servers or at the root server. In implementations where the query processor optimizes the query at the various servers, each server may optimize the query for the portions of the index that it hosts. For example, in implementations that use short circuiting, each server can short circuit useless nodes, e.g. term nodes with no documents in the posting list on the server, at the time the query tree is optimized and the jump-table created or logic generated, rather than waiting until execution of the query against the portion of the index stored on the server.

Next-Match

In some implementations, recursive calls may be minimized by reducing the number of document identifiers processed by the tree. For example, in some implementations the query processor may traverse the tree using a next-match process. In a next-match process the term nodes of the tree may remember the last-checked index into the posting list and start the search at that identifier. This allows the node to skip having to search the entire posting list in subsequent calls. In such implementations, the term node may return a document identifier of the first matching document at or after the passed-in document id rather than returning true/false.

For example, if the posting list for a term node contains an identifier matching a given identifier, the term node returns that same document identifier. If the posting list of the term node does not contain the given identifier, the term node returns the last identifier checked that is greater than the given identifier. In other words, the term node returns the smallest matching identifier that is greater than the given identifier. If no identifiers remain in the posting list, e.g., if there are no document identifiers in the posting list greater than the document id passed in, the term node may return a special document identifier that is larger than any valid document identifier or another kind of error code. Thus, if a root node is queried for document 1, the node may return document 16 as a result. In this example, documents 2-15 may be skipped. The pseudo-code to implement a next-match search in a leaf node is illustrated in FIG. 14. In the example of FIG. 14 the node.index represents that last-checked index for the node and would initially be set to a starting value, such as zero or one. END_ID represents a value larger than any valid identifier. Furthermore, for the pseudo-code to correctly function, the id passed to the node must be non-decreasing across calls within the same node.

Figures 15, 16:
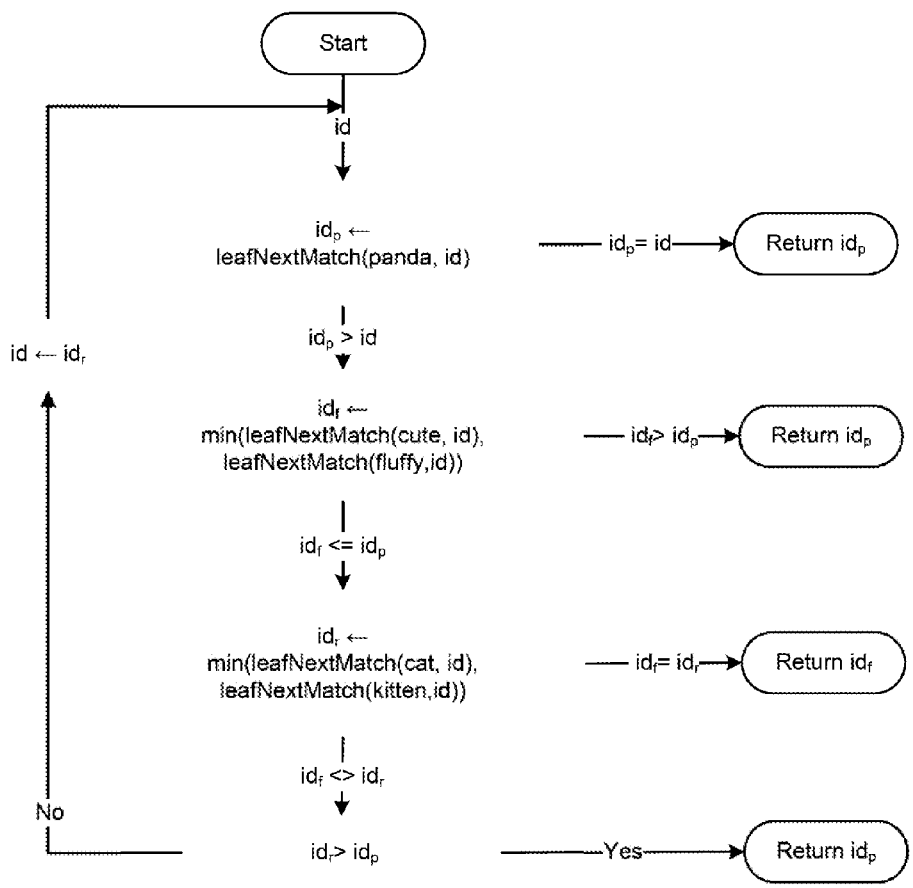
FIG. 15 illustrates an example of pseudo-code for an AND operator node using next-match query execution.
FIG. 16 illustrates a control-flow graph for next-match query execution.

The operator nodes may also have a next-match function. For example, an implementation of the OR operator may return the lowest document id returned from a call to leafNextMatch for each of its children. An AND operator may return a minimum common value from a call to leafNextMatch for each of its children. To accomplish this, the and NextMatch function may assign a min_id to the value of the id passed to the function. This min_id may be passed to each of its children. If any of the children return an identifier greater than the min_id, the min_id may be set to the identifier returned and each of the children is called again with the min_id. When all children agree on the same value, the search is complete. FIG. 15 illustrates example pseudo-code for the and NextMatch logic discussed above.

A virtual nextMatch( ) function may be used to traverse the tree, so that each parent calls nextMatch( ) for each of its children. The virtual nextMatch( ) function may determine, based on the type of node or a property of the node, the proper logic to invoke, for example leafNextMatch for term nodes and or NextMatch for an OR operator node.

An example of using next-match to traverse the query tree shown in FIG. 5 follows. The query processor may call the root of the tree, $OR_1$, with a document identifier of 1 using nextMatch( ). Using the posting lists of table 2 above, the panda node may return document identifier 1 from the nextMatch( ) call. The AND node may send the document identifier of 1 to each of its children, which are both OR nodes. The OR nodes may return the minimum document identifier from its children. For the $OR_2$ node this is 1 and for the $OR_3$ node this is 4. Because 4 is not equal to the identifier passed to the $OR_3$ node, the AND node may reset the min_id to 4 and send this identifier to its children. This time both children return 4, so the AND node returns 4. Because 1 is smaller than 4, the $OR_1$ node returns 1 as a matching document. The $OR_1$ node may then send document identifier 2 to its children. The panda node may return 6 and the AND node would again return 4. Because 4 is smaller than 6, the $OR_1$ node may return the 4. Thus, the search result list at this point contains the document identifiers 1 and 4.

The $OR_1$ node may then call its children with document identifier 5. The query process does not need to send identifier 3 or 4 because it already knows the outcome. The panda node again returns 6 and the AND node calls its children with the identifier 5. The OR$_2$ node returns 5 and the OR$_3$ node returns 8. Because 8 does not match the current min_id, which is 5, the min_id is set to 8 and the AND node calls each of its children with this document identifier. In response, the OR$_2$ node returns 9. Note that the fluffy node returns END_ID to the OR$_2$ node, which means that it has no documents with an identifier equal to or greater than 8. Because the cute node returned document identifier 9, the OR$_2$ node is able to return 9. If both nodes were to return END_ID, then the OR$_2$ node returns END_ID as well. Because the OR$_2$ node returned 9, the min_id may be set to 9 and the AND node calls its children again with the document identifier of 9. This time both children return 9, and the AND node returns this value to the OR$_1$ node. Because 6 is less than 9, the OR$_1$ node returns 6, which is added to the results list.

The OR$_1$ node may then call its children with the document id of 7. The panda node returns 12 and the AND node again returns 9. Because 9 is less than 12, the OR$_1$ node returns 9 and calls its children with the document identifier of 10. The panda node returns 12 and the AND node returns END_ID because none of the leaf nodes in its tree have a document identifier equal to or higher than 10. Thus, the OR$_1$ node returns 12 and calls its children with 13. At this point, both children return END_ID, which means that all matching document identifiers have been returned. Additionally, we know that no document identifiers past 12 need be searched. Thus, if the corpus contains 25 documents, using next-match method described above, the root node of the query tree need only make a call to its children six times (for documents 1, 2, 5, 7, 10, and 13), rather than once for each of the 25 documents in the corpus. This reduces the number of calls made by the search engine to determine the result list, thus improving response time.

Another improvement on next-match is to allow the nodes to return multiple candidate documents, rather than just the next match. This may be accomplished by allowing the leaf nodes to send a set of document identifiers to its parent node. In some implementations only a few of the leaf nodes may be asked to send multiple document identifiers. For example, the left-most leaf node for an AND operator may return a set of its document identifiers, and these document identifiers may be sent individually to the other children of the AND node. This works especially well when the children of the AND are arranged so that the nodes with the fewest identifiers in their posting list occupy the left-most branch of the query tree.

In some implementations, the query processor may use a combination of calls to nextMatch( ) and MATCH( ) for processing a query tree, depending on the properties of each of the nodes. For example, the query processor may use nextMatch( ) for leaf nodes, but for complex interior nodes that rarely match anything, nextMatch( ) may be expensive. Thus, the query processor may call MATCH( ) for some nodes and nextMatch( ) for other nodes.

Flattening Using Next-Match

In some implementations, flattening may be combined with next-match for even more improved query optimization. However, to account for the document identifiers being passed back rather than a true/false, the control flow may change from a finite state machine to an expression-based state machine or the control flow may use a register to hold the current minimum possible match for the finite state machine. FIG. 16 illustrates an example of an expression-based state machine for an entirely flattened query tree, like the query tree represented by the control-flow graph of FIG. 11. Each expression adds or modifies a value in the variable environment. The control flow may be generated based on traversal of the portion of the query tree being flattened. The query processor may generate either a jump-table or logic to traverse the flattened tree based on the control flow. For example, if the query processor generates logic, each step in the expression-based state machine may be a line of code in the generated logic. FIG. 17 illustrates an example of pseudo code for the control flow graph of FIG. 16.

In some implementations, the query processor may generate a jump-table rather than generating logic. The jump table may branch based on whether a call to a child returns the requested document identifier, a larger document identifier, or an end-of-match condition, such as—a document identifier greater than any valid identifiers or some other error code. FIG. 18 illustrates an example of a jump-table for the flattened query shown in FIG. 6. In FIG. 18, END_ID is an end-of-match condition where the identifier is larger than any valid document identifier. In other words, when returned by nextMatch( ) END_ID indicates the matches have been exhausted for the node. Also in FIG. 18, match_id is the result of a nextMatch(min_id) call to the node. When using the jump table the query processor may initialize min_id to the given document identifier and may initialize group_min_id to END_ID.

The query processor may also use short circuiting, as described above, with the next-match jump-table. For example, when a node returns END_ID as the min_id, the query processor may short-circuit the node by modifying references to the node, e.g., goto 4, with the "match_id>min_id" branch of the node. For example, if the kitten node returns END_ID, the query processor may change the "goto 4" reference of the cat node in FIG. 18 to "min_id=group_min_id; group_min_id=END_ID; goto 1."

Figure 19:
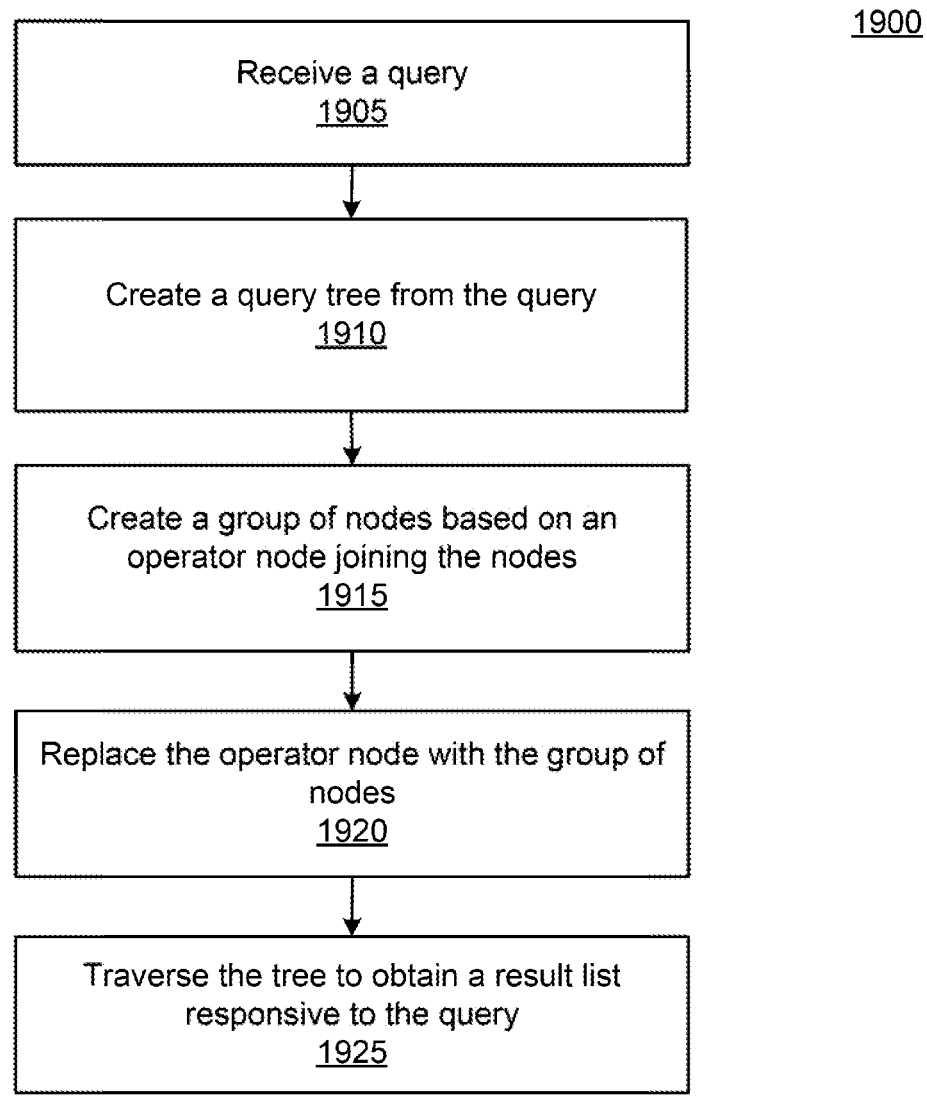
FIG. 19 illustrates a flow diagram of an example of a process for creating a flattened query tree that can be used in the described techniques.

FIG. 19 is a flow diagram of a process 1900 for flattening a search query, consistent with some implementations. Process 1900 shown in FIG. 19 may be performed by a query processor, such as query processor 124 shown in FIG. 1. In implementations with a distributed index, the query processor may be located at a central server, such as a search system, and sent to the servers of the distributed index, or each of the servers of the distributed index may have their own query processor that performs process 1900. In some implementations, portions of process 1900 may be performed by a query processor at a central server and portions of process 1900 may be performed by a query processor at each of the servers of the distributed index.

Process 1900 may begin with the query processor receiving a query (1905). The query processor may then create a query tree from the query (1910). The query tree may be a representation in memory of the nodes of the tree. In some implementations, the query processor may first analyze the term nodes of the query tree before placement within the tree. For example, the query processor may look at the children of an OR operation and place the child with the longest posting list, e.g., the most document identifiers, in the left-most branch for the OR. Similarly, the query processor may place the child with the shortest posting list in the left-most branch of an AND operator. In implementations with a distributed index, each server may end up with a different query tree, with the leaf nodes in a different order, depending on the length of the posting list for each term on the particular server.

The query processor may then analyze the tree to locate a group of nodes joined by a common operator (1915). The group of nodes and the common operator may be considered candidates for flattening. In some implementations, the query processor may evaluate the common operator or the children to determine whether to flatten this portion of the tree, as explained in further detail with regard to FIG. 20. If the query processor decides to flatten the tree, the query processor may replace the operator node of the tree with the group of nodes (1920). To accomplish this, the query processor may change the parent of the common operator node to view the nodes as its children. For example, the parent of the common operator node may be modified to use a jump-table, as described above, or may have code generated to specifically handle its new child nodes. A flattened query tree may result from the replacement of the common operator node with the group of child nodes.

The query processor may then traverse the flattened tree to obtain a result list responsive to the query (1925). In some implementations, the query processor may use a jump-table in the flattened portion of the tree. In such implementations, as part of traversing the tree the query processor may receive an indication that a particular node has exhausted its potential matches. Accordingly, the query processor may short-circuit the particular node by replacing references to the node in the jump-table with a reference to the index that the particular node would branch to if returning false. In other words, references to the particular node may be replaced by a reference to the node that would be chosen if the particular node returned false.

Figure 20:
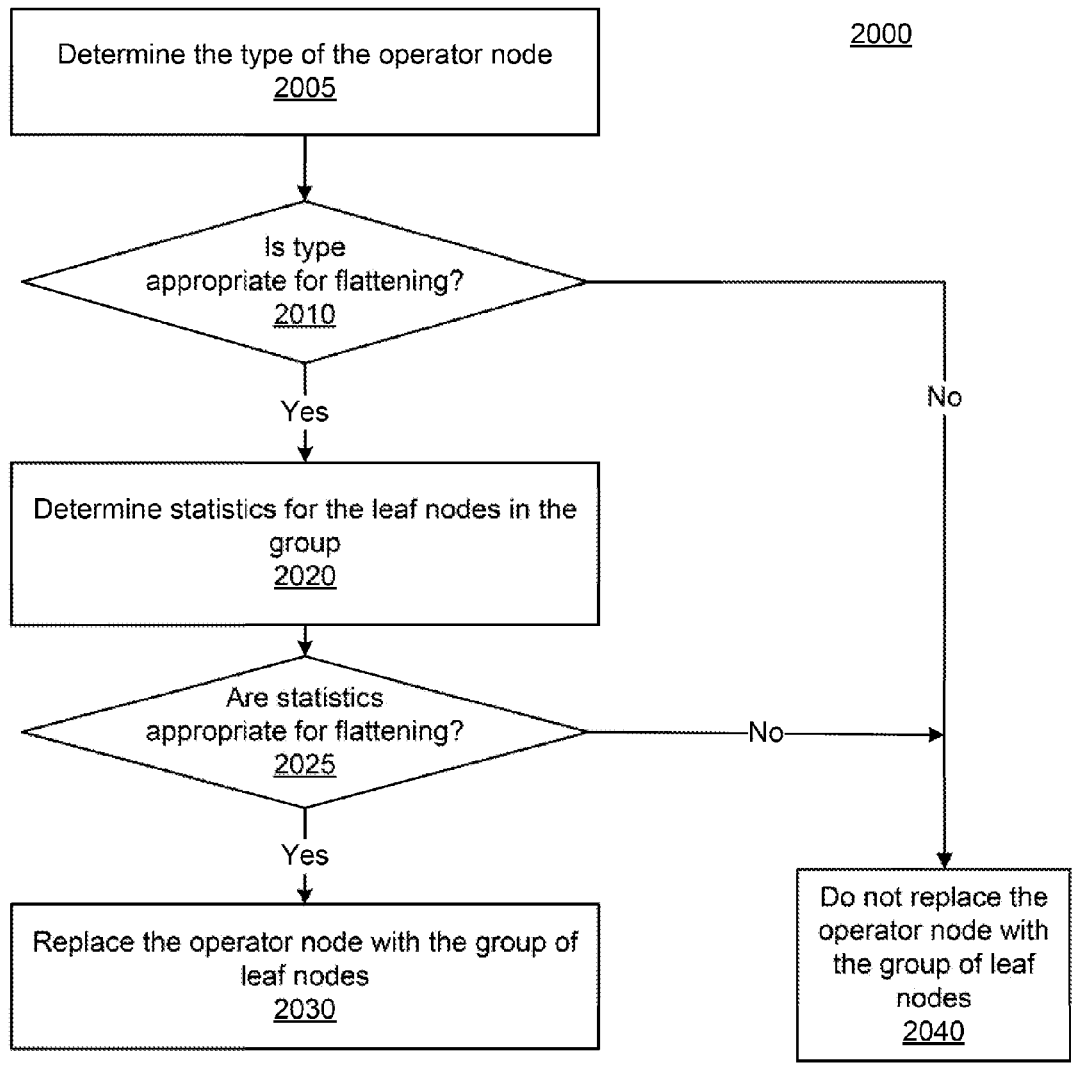
FIG. 20 illustrates a flow diagram of an example of a process for determining whether to flatten a portion of a query tree that can be used in the described techniques.

FIG. 20 illustrates a flow diagram of a process 2000 for determining whether to flatten a search query, consistent with some implementations. Process 2000 may be performed by a query processor after identifying a candidate for flattening, as described above with regard to step 1915 of FIG. 19. When the query processor identifies a candidate for flattening, the query processor may determine the type of operator node being considered (2005). Some operator nodes are cheaper and easier to flatten than others. For example, AND, OR, NOT, and N of M, are relatively easy to flatten and may be considered appropriate for flattening. Even if the operator is not one of those identified above, if the operator has other characteristics, such as a large number of children, the operator may be considered appropriate for flattening. On the other hand, especially with multi-level flattening, if the children of the operator node include a mixture of operations, or a number of already grouped nodes, the operator may not be appropriate for flattening.

If the query processor determines that the operator node is not appropriate for flattening (2010, No), the query operator may refrain from flattening this portion of the query tree (2040). But if the operator node is appropriate for flattening (2010, Yes), the query processor may then consider statistics for or properties of the nodes in the group (2020). For example, the nodes may contain a particular type of posting list, a short posting list, or the system may keep a history of the frequency of use of a particular grouping, and these statistics may indicate the node is not appropriate for flattening because the cost to flatten outweighs the benefits. If the statistics are not appropriate for flattening (2025, No), the query processor would again refrain from flattening this candidate group (2040). Otherwise, the query processor may replace the operator nodes with the group of nodes (2030), as described above with regard to step 1920 of FIG. 19.

FIG. 21 shows an example of a generic computer device 2100, which may be system 100, and/or a computing device 190 of FIG. 1, and a generic mobile computer device 2150, which may be a client device, such as computing device 190 of FIG. 1, both of which may be used with the techniques described here. Computing device 2100 is intended to represent various forms of digital computers, such as laptops, desktops, workstations, personal digital assistants, servers, blade servers, mainframes, and other appropriate computers. Computing device 2150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 2100 includes a processor 2102, memory 2104, a storage device 2106, a high-speed interface 2108 connecting to memory 2104 and high-speed expansion ports 2110, and a low speed interface 2112 connecting to low speed bus 2114 and storage device 2106. Each of the components 2102, 2104, 2106, 2108, 2110, and 2112, are interconnected using various busses, and may be mounted on a common motherboard or in other manners as appropriate. The processor 2102 can process instructions for execution within the computing device 2100, including instructions stored in the memory 2104 or on the storage device 2106 to display graphical information for a GUI on an external input/output device, such as display 2116 coupled to high speed interface 2108. In some implementations, multiple processors and/or multiple buses may be used, as appropriate, along with multiple memories and types of memory. Also, multiple computing devices 2100 may be connected, with each device providing portions of the necessary operations (e.g., as a server bank, a group of blade servers, or a multi-processor system).

The memory 2104 stores information within the computing device 2100. In one implementation, the memory 2104 is a volatile memory unit or units. In another implementation, the memory 2104 is a non-volatile memory unit or units. The memory 2104 may also be another form of computer-readable medium, such as a magnetic or optical disk.

The storage device 2106 is capable of providing mass storage for the computing device 2100. In one implementation, the storage device 2106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2104, the storage device 2106, or memory on processor 2102.

The high speed controller 2108 manages bandwidth-intensive operations for the computing device 2100, while the low speed controller 2112 manages lower bandwidth-intensive operations. Such allocation of functions is one example. In one implementation, the high-speed controller 2108 is coupled to memory 2104, display 2116 (e.g., through a graphics processor or accelerator), and to high-speed expansion ports 2110, which may accept various expansion cards (not shown). In the implementation, low-speed controller 2112 is coupled to storage device 2106 and low-speed expansion port 2114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2100 may be implemented in a number of different forms, as shown in the figure. For example, it may be implemented as a standard server 2121, or multiple times in a group of such servers. It may also be implemented as part of a rack server system 2124. In addition, it may be implemented in a personal computer such as a laptop computer 2122. An entire system, such as system 100, may be made up of multiple computing devices 2100 communicating with each other. For example, system 100 of FIG. 1 may include a server 2120 or rack servers 2124 as the indexing system, a separate computing device 2100 as a search system, and one or more servers 2120 or rack servers 2124 as a serving cluster. Other configurations are possible.

Computing device 2150 may include a processor 2152, memory 2164, an input/output device such as a display 2154, a communication interface 2166, a GPS (Global Positioning System) receiver module 2170, and a transceiver 2168, among other components. Each of the components 2150, 2152, 2164, 2154, 2166, and 2168, are interconnected using various buses, and several of the components may be mounted on a common motherboard or in other manners as appropriate.

Processor 2152 may communicate with a user through control interface 2158 and display interface 2156 coupled to a display 2154. The display interface 2156 may comprise appropriate circuitry for driving the display 2154 to present graphical and other information to a user. The control interface 2158 may receive commands from a user and convert them for submission to the processor 2152. In addition, an external interface 2162 may be provided in communication with processor 2152, so as to enable near area communication of device 2150 with other devices. The memory 2164 may include expansion memory 2174 provided through expansion interface 2172. Device 2150 may communicate wirelessly through communication interface 2166, which may include digital signal processing circuitry where necessary.

Device 2150 may also communicate audibly using audio codec 2160, which may receive spoken information from a user and convert it to usable digital information. Audio codec 2160 may likewise generate audible sound for a user, such as through a speaker, e.g., in a handset of device 2150. Such sound may include sound from voice telephone calls, may include recorded sound (e.g., voice messages, music files, etc.) and may also include sound generated by applications operating on device 2150. The computing device 2150 may be implemented in a number of different forms, as shown in the figure. For example, it may be implemented as a cellular telephone 2180. It may also be implemented as part of a smart phone 2182, personal digital assistant, or other similar mobile device.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of processing a query at a computer system comprising one or more processors and a memory storing one or more programs for execution of the method by the one or more processors, the method comprising:

building a query tree based on the query;

grouping at least some nodes of the query tree into a group of nodes based on an operator node that is a parent of the at least some nodes, the group of nodes retaining the functionality of the operator node; eliminating the operator node by replacing the operator node with the group of nodes in the tree; and traversing the tree to obtain a result list from a search index responsive to the query.

2. The method of claim 1, wherein as part of traversing the tree each call to a child node returns a plurality of matches.

3. The method of claim 1, wherein the query is a document search query, the at least some nodes are leaf nodes representing one or more query terms and the result list indicates documents responsive to the query.

4. The method of claim 3, wherein as part of traversing the tree each call to a child node includes a first document identifier, and wherein the leaf nodes use the first document identifier as a starting identifier.

5. The method of claim 4, wherein the child node returns a second document identifier, the second document identifier being a next matching document.

6. The method of claim 5, wherein the child node returns an error code if a next matching document does not exist.

7. The method of claim 1, wherein the operator node is an OR operator and traversing the tree includes skipping remaining members of the group once a matching result has been identified from a member of the group.

8. The method of claim 1, wherein the operator node is an AND operator and traversing the tree includes skipping remaining members of the group once a member of the group fails to find a matching result.

9. The method of claim 1, wherein replacing the operator node includes modifying a parent node of the operator node to recognize the group of nodes.

10. The method of claim 9, wherein modifying the parent node includes creating a jump-table, the jump-table enabling a particular node to branch directly to another node.

11. The method of claim 10, wherein as part of traversing the tree, the method further includes cutting a branch of the query tree by modifying the jump-table when the another node exhausts its possible matches.

12. The method of claim 9, wherein modifying the parent node includes:
generating logic for the parent node using control flow analysis; and
using the logic to search the index.

13. The method of claim 1, further comprising:
determining whether the operator node is a specific type of operator; and
performing the replacing when it is determined that the operator node is the specific type of operator.

14. The method of claim 1, further comprising
collecting statistics on frequency of use of group configurations; and
determining whether the statistics indicate flattening is appropriate,
wherein the replacing is not performed when it is determined that the statistics do not indicate flattening is appropriate.

15. A tangible computer-readable storage medium having recorded and embodied thereon instructions that, when executed by the one or more processors of the computer system, cause the computer system to perform the method of claim 1.

16. The method of claim 1, the group of nodes including at least one leaf node and at least one operator node.

17. A system comprising:
one or more processors; and
one or more memories storing an index and instructions that, when executed by the one or more processors, cause the processors to perform the operations of:
receiving a query to process against a search index;
building a query tree based on the query;
grouping at least some nodes of the query tree into a group of nodes based on an operator node that is a parent of the at least some nodes, the group of nodes retaining the functionality of the operator node; eliminating the operator node by replacing the operator node with the group of nodes in the tree; and
traversing the tree to obtain a result list from the search index responsive to the query.

18. The system of claim 17, wherein replacing the operator node includes modifying a parent node of the operator node to recognize the group of nodes.

19. The system of claim 18, wherein modifying the parent node includes creating a jump-table, the jump-table enabling a particular node to branch directly to another node.

20. The system of claim 19, wherein as part of traversing the tree, the operations further include cutting a branch of the query tree by modifying the jump-table when the another node exhausts its possible matches.

21. The system of claim 18, wherein modifying the parent node includes:
generating logic for the parent node using control flow analysis; and
using the logic to search the index.

22. The system of claim 17, the operations further comprising:
determining whether the operator node is a specific type of operator; and
performing the replacing when it is determined that the operator node is the specific type of operator.

23. A method of flattening a search query at a computer system comprising one or more processors and a memory storing one or more programs for execution of the method by the one or more processors, the method comprising:
building a query tree based on the query;
identifying a portion of the tree for flattening, the portion including at least one operator node and children of the operator node;
eliminating the at least one operator node by generating a jump-table for the portion of the tree, the jump-table including a row for the children of the operator node, each row including an indication of a next node to invoke based on a result of a match operation performed by the node associated with the row; and
traversing the tree using the jump-table and a search index to obtain a result list that is responsive to the query.

24. The method of claim 23, wherein as part of traversing the tree, the method further includes:
identifying an end-of-list condition for a match operation on a particular node; and
in response to identifying the end-of-list condition, modifying the jump-table to skip the row associated with the particular node.

25. The method of claim 23, the match operation returning a first identifier, the first identifier being equal to or greater than a second identifier that is given to the match operation.

26. The method of claim 25, the jump-table including an indication of a first next node if the second identifier matches the first identifier and including an indication of a second next node if the first identifier is greater than the second identifier.

27. A tangible computer-readable storage medium having recorded and embodied thereon instructions that, when executed by the one or more processors of the computer system, cause the computer system to perform the method of claim 23.

* * * * *

UNITED STATES PATENT AND TRADEMARK OFFICE
CERTIFICATE OF CORRECTION

PATENT NO.        : 8,661,023 B1                                        Page 1 of 1
APPLICATION NO.   : 13/588545
DATED             : February 25, 2014
INVENTOR(S)       : Won S. Chun et al.

It is certified that error appears in the above-identified patent and that said Letters Patent is hereby corrected as shown below:

On the title page, item (75) under "Inventors", in line 4, delete "Braircliff" and insert --Briarcliff--, therefor.

Signed and Sealed this
Twenty-fourth Day of June, 2014

Michelle K. Lee
*Deputy Director of the United States Patent and Trademark Office*